(12) United States Patent
Bannon (10) Patent No.: US 9,656,763 B2
(45) Date of Patent: May 23, 2017

(54) STOW LOCK PAWL FOR A RAT ACTUATOR (71) Applicant: Hamilton Sundstrand Corporation, Windsor Locks, CT (US)

(72) Inventor: David G. Bannon, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 294 days.

(21) Appl. No.: 14/458,543

(22) Filed: Aug. 13, 2014

(65) Prior Publication Data
US 2016/0046383 A1    Feb. 18, 2016

(51) Int. Cl.
*F15B 15/14* (2006.01)
*B64D 41/00* (2006.01)
*F16B 7/14* (2006.01)
*F15B 15/26* (2006.01)

(52) U.S. Cl.
CPC ............ *B64D 41/007* (2013.01); *F15B 15/14* (2013.01); *F15B 15/26* (2013.01); *F15B 15/261* (2013.01); *F16B 7/1409* (2013.01); *F05D 2220/34* (2013.01)

(58) Field of Classification Search
CPC ... B64D 41/007; F05D 2220/34; F15B 15/14; F15B 15/26; F15B 15/261; F16B 7/1409
See application file for complete search history.

(56) References Cited

U.S. PATENT DOCUMENTS

| | | | |
|---|---|---|---|
| 3,107,933 A | 10/1963 | Royster | |
| 3,889,576 A * | 6/1975 | Sheffer | F15B 15/261 91/26 |
| 4,740,122 A | 4/1988 | Glaser | |
| 4,991,796 A | 2/1991 | Peters et al. | |
| 5,366,313 A | 11/1994 | LaBarre | |
| 6,832,540 B2 | 12/2004 | Hart | |
| 7,654,371 B1 | 2/2010 | Metz et al. | |
| 7,707,924 B2 | 5/2010 | Yamanouchi et al. | |
| 8,042,417 B2 | 10/2011 | Davies et al. | |
| 2012/0297924 A1 | 11/2012 | Lang et al. | |

FOREIGN PATENT DOCUMENTS

EP    2527664 A1    11/2012

OTHER PUBLICATIONS

Extended European Search Report, EP Application No. 15180780.7-1754 / 2985472, dated Jan. 25, 2016, 8 pages.

* cited by examiner

*Primary Examiner* — Logan Kraft
(74) *Attorney, Agent, or Firm* — Kinney & Lange, P.A.

(57) ABSTRACT

An actuator for a ram air turbine system includes a piston rod that is cylindrical in shape and centered about a centerline, and stow lock pawls supported by the piston rod and able to move radially. Each of the stow lock pawls has a crown with a crown radius. The actuator further includes a lock bolt extending along the centerline radially within the piston rod and configured to be axially movable within the piston rod between a stowed position and a deployed position. The actuator further includes rollers radially outward from the centerline configured to be guided by the lock bolt and a cylinder having a mating surface with a mating radius. The cylinder is positioned radially outward from the piston rod and configured to be axially movable between the stowed position and the deployed position. A ratio of the crown radius of the stow lock pawls to the mating radius of the cylinder is less than 0.98.

13 Claims, 8 Drawing Sheets

STOW LOCK PAWL FOR A RAT ACTUATOR

BACKGROUND

This disclosure relates to a Ram Air Turbine (RAT) deployment and stowing system.

A Ram Air Turbine is a device for generating emergency supplemental power utilized on numerous aircraft to provide hydraulic and electrical power. The RAT is stowed in the aircraft structure and deployed into the air stream by an actuator. The actuator is attached to aircraft structure and to an arm on the strut of the RAT. On deployment, the deployment actuator forces the RAT to swing out of its stowed, or retracted, position in the aircraft and into the air stream. The air stream acts on the RAT blades to spin the turbine and governor assembly, which in turn operates an electrical generator and hydraulic pump providing power to the aircraft. When not needed, the actuator stows the RAT within the aircraft.

SUMMARY

An actuator for a ram air turbine system includes a piston rod that is cylindrical in shape and centered about a centerline, and stow lock pawls supported by the piston rod and able to move radially. Each of the stow lock pawls has a crown with a crown radius. The actuator further includes a lock bolt extending along the centerline radially within the piston rod and configured to be axially movable within the piston rod between a stowed position and a deployed position. The actuator further includes rollers radially outward from the centerline configured to be guided by the lock bolt and a cylinder having a mating surface with a mating radius. The cylinder is positioned radially outward from the piston rod and configured to be axially movable between the stowed position and the deployed position. A ratio of the crown radius of the stow lock pawls to the mating radius of the cylinder is less than 0.98.

DETAILED DESCRIPTION

The present disclosure relates to an actuator for a RAT system. The actuator includes a plurality of stow lock pawls with a crown shaped to reduce stress when mating with an inner cylinder of the actuator as described below. During deployment and stowing of the actuator, the actuator uses hydraulic pressure to control the movement of the actuator components, including the inner cylinder and the stow lock pawls. During deployment and stowing, the movement of the inner cylinder and the stow lock pawls results in mating between the inner cylinder and the stow lock pawls. Due to varying actuator loads, the mating of the inner cylinder and the stow lock pawls results in varying stresses on the crown of the stow lock pawls. The shape of the crown provides an advantageous stress distribution along the crown at varying actuator loads.

Figure 1:
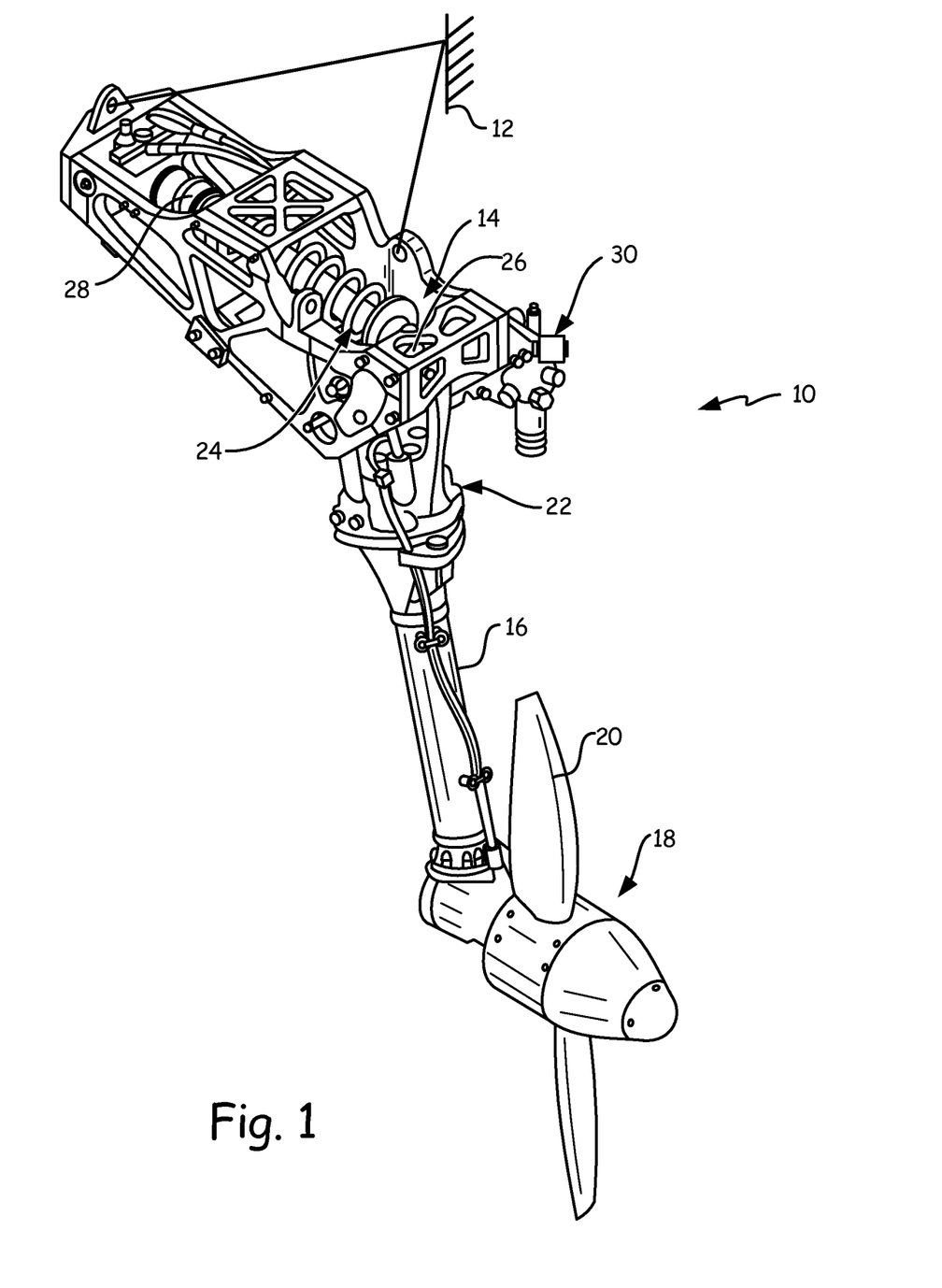
FIG. 1 is a perspective view of a RAT system in a deployed position.

FIG. 1 is a perspective view of RAT system 10 in a deployed position and secured to aircraft structure 12. RAT system 10 includes housing 14, strut 16, turbine 18 with blades 20, electric generator 22, actuator 24 with first end 26 and second end 28, and hydraulic pump 30. RAT system 10 is secured to aircraft structure 12 by housing 14. Housing 14 pivotally supports strut 16 having turbine 18 at one end. Turbine 18 includes blades 20, which impart rotational drive to electric generator 22 and hydraulic pump 30. Actuator 24 is secured to strut 16 at first end 26 and to housing 14 at second end 28. Actuator 24 is shown in its deployed position in FIG. 1.

Figure 2A:
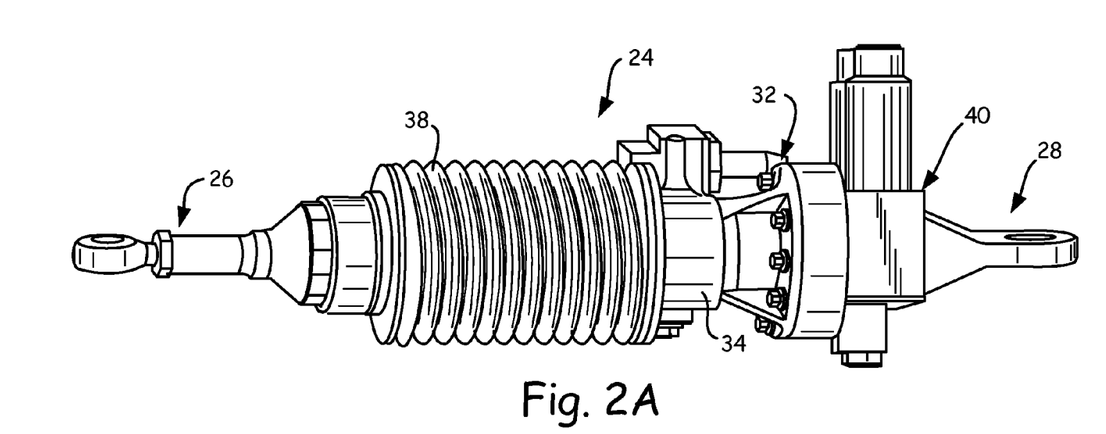
FIG. 2A is a perspective view of the actuator in FIG. 1 in a stowed position.
Figure 2B:
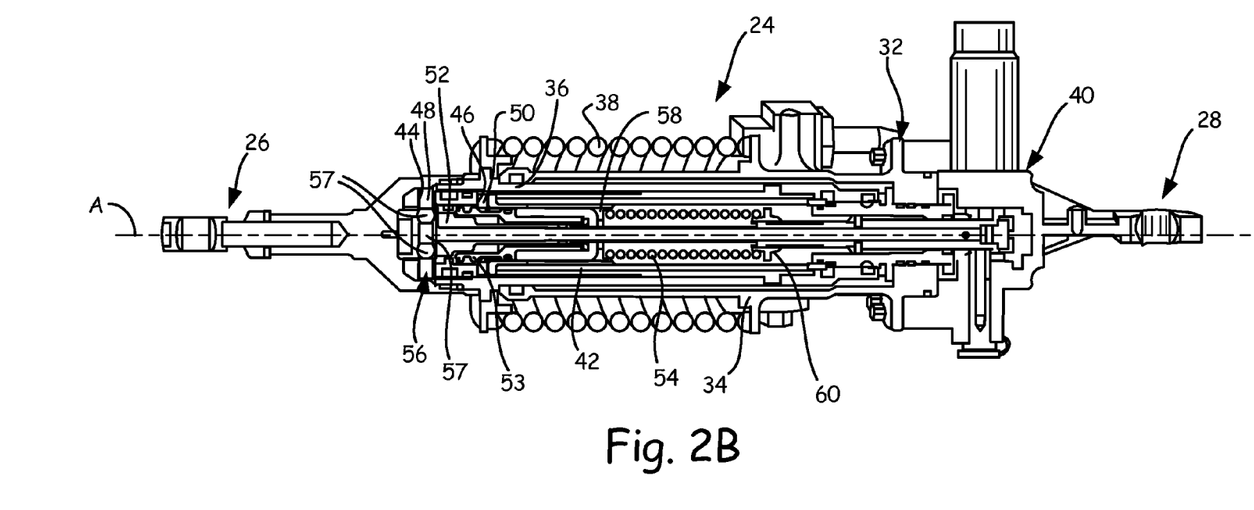
FIG. 2B is a cross-sectional view of the actuator in FIG. 1 in a stowed position.

FIG. 2A is a perspective view of actuator 24 in a stowed position. FIG. 2B is a cross-sectional view of actuator 24 in a stowed position. Actuator 24 includes first end 26, second end 28, casing 32, first cylinder 34, second cylinder 36, deploy spring 38, latch components 40, piston rod 42 with first aperture 44 and second aperture 46, stow lock pawls 48, down-lock wedges 50, lock bolt 52, slider 53, lock bolt spring 54, roller assembly 56 with rollers 57, flange 58, and collar 60.

First cylinder 34 is adjacent to but not attached to housing 32. Second cylinder 36 is arranged telescopically with first cylinder 34. Second cylinder 36 is received within first cylinder 34 when actuator 24 is in the stowed position. Deploy spring 38 is radially outward from and between the ends of first cylinder 34 and second cylinder 36 and is in a compressed state when actuator 24 is in a stowed position. Latch components 40 are located near second end 28 and work to actuate and initiate the deployment of RAT system 10 through the extension of actuator 24.

Piston rod 42 is affixed to casing 32 such that piston rod 42 is rigidly attached to first cylinder 34 so that second cylinder 36 can slide between and relative to piston rod 42 and first cylinder 34 when extending into a deployed position or retracting into a stowed position. Piston rod 42 does not move relative to first cylinder 34, and second cylinder 36 slides axially along a radially outer side of piston rod 42 when actuator 24 is being deployed or stowed. Piston rod 42 includes first aperture 44 and second aperture 46, which receive stow lock pawls 48 and down-lock wedges 50, respectively. Stow lock pawls 48 are arranged circumferentially around piston rod 42. In the embodiment shown, stow lock pawls 48 includes four pawls. In alternative embodiments, stow lock pawls 48 can include three pawls or two pawls.

Lock bolt 52 and slider 53 (which is radially outward from a portion of lock bolt 52) are arranged slideably within piston rod 42 and are configured to actuate stow lock pawls 48 to lock actuator 24 in the stowed position and actuate down-lock wedges 50 to lock actuator 24 in the deployed position. Piston rod 42 includes flange 58, which is spaced from collar 60. Lock bolt spring 54 is provided between and engages flange 58 and collar 60 to bias piston rod 42 and lock bolt 52 apart along centerline A.

Roller assembly 56 includes rollers 57, which are guided by lock bolt 52 and arranged radially between lock bolt 52 and stow lock pawls 48 when actuator 24 is in a stowed position. Lock bolt 52 extends from second end 28 to roller assembly 56 and guides rollers 57. When roller assembly 56 is not in a stowed position, roller assembly 56 is radially inside the piston rod 42 and axially guided by the lock bolt 52. Rollers 57 are spaced circumferentially around the portion of lock bolt 52 that guides rollers 57 and may be cylindrical in shape. In the embodiment shown, roller assembly 56 includes four rollers 57. In alternative embodiments, roller assembly 56 can includes three rollers 57 or two rollers 57.

Figure 3A:
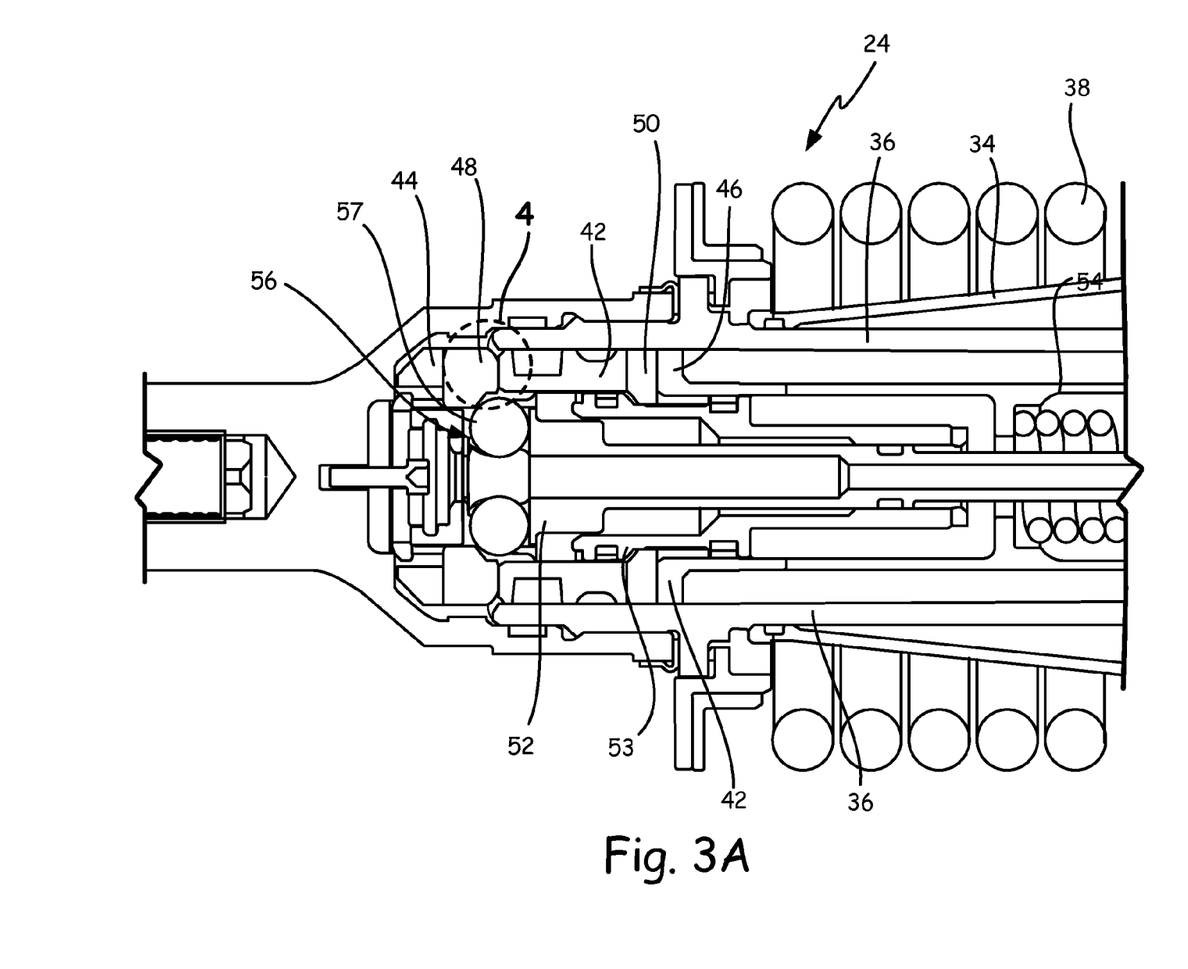
FIG. 3A is an enlarged cross-sectional view of the actuator in FIG. 2B in a stowed and locked position.
Figure 3B:
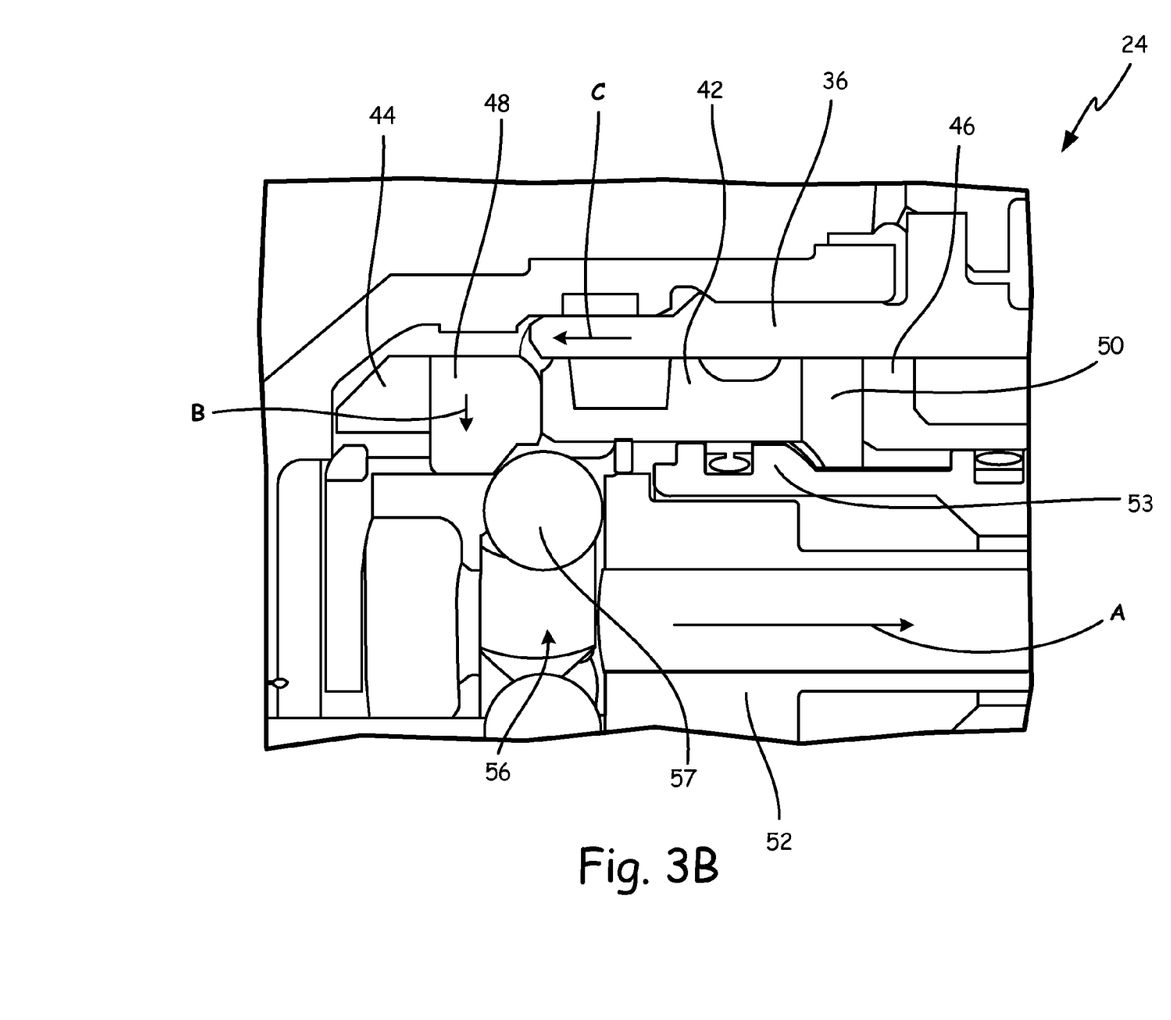
FIG. 3B is an enlarged cross-sectional view of the initiation of deployment of the actuator in 2B.
Figure 3C:
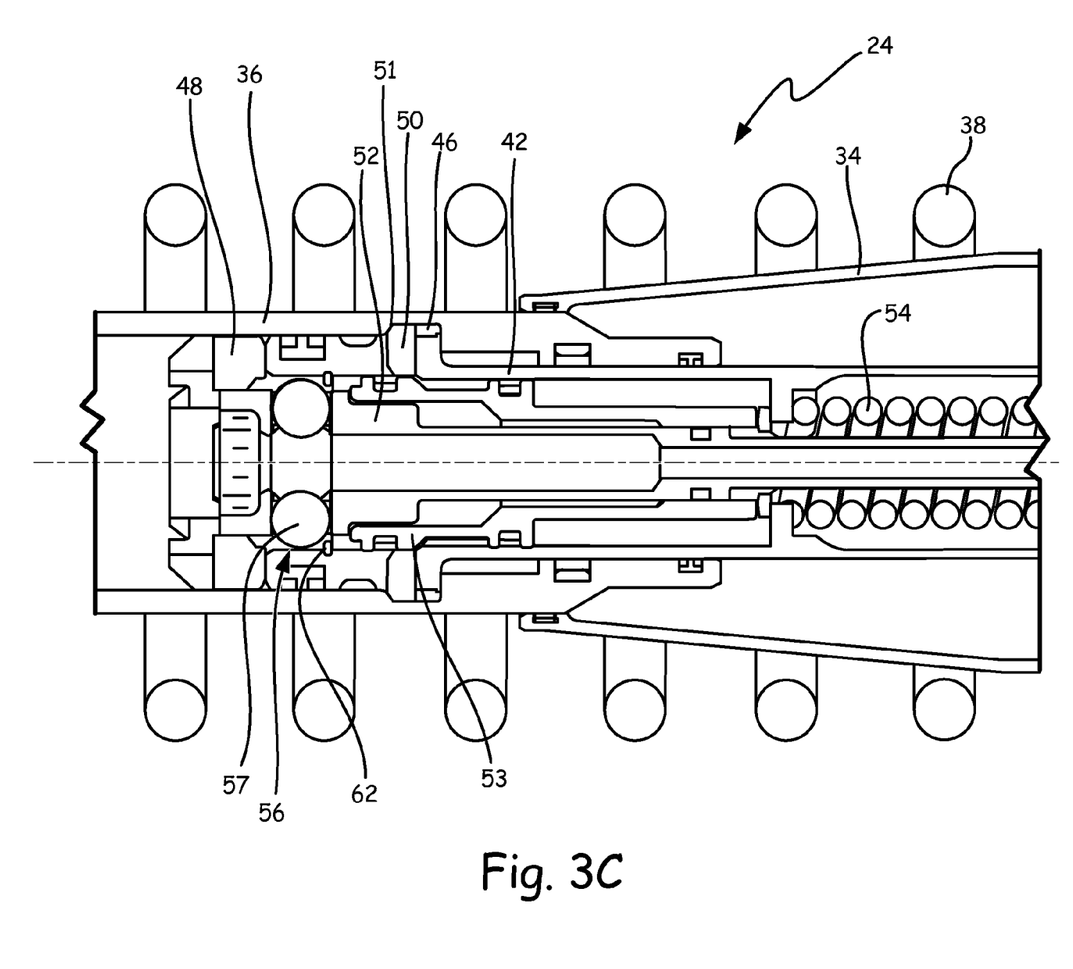
FIG. 3C is an enlarged cross-sectional view of the actuator in FIG. 2B in a deployed position.

FIG. 3A is an enlarged cross-sectional view of actuator 24 in FIG. 2B in a stowed and locked position. FIG. 3B is an enlarged cross-sectional view of the initiation of deployment of actuator 24. FIG. 3C is an enlarged cross-sectional view of actuator 24 in a deployed position. Actuator 24 includes first cylinder 34, second cylinder 36 with groove 51, deploy spring 38, piston rod 42 with first aperture 44 and second aperture 46, stow lock pawls 48, down-lock wedges 50, lock bolt 52, slider 53, roller assembly 56 with rollers 57, and stop 62.

Referring now to FIGS. 2B and 3A-3C, in operation, to initiate deployment of RAT system 10, lock bolt 52 and slider 53 are allowed to move axially (in the direction of arrow A in FIG. 3B) in response to the biasing force from lock bolt spring 54, which is free to act on lock bolt 52 and slider 53 due to the unlocking of latch components 40. Movement of roller assembly 56 (in the direction of arrow A in FIG. 3B) permits stow lock pawls 48 to move radially inward (in the direction of arrow B in FIG. 3B) and disengage from second cylinder 36, thereby enabling second cylinder 36 to move axially away from first cylinder 34 (in the direction of arrow C in FIG. 3B) and piston rod 42 due to the force on second cylinder 36 caused by deploy spring 38 and other external applied forces. As second cylinder 36 moves away from first cylinder 34, second cylinder 36 pushes stow lock pawls 48 out of the way, resulting in stress on stow locks pawls 48 and second cylinder 36.

Deploy spring 38 causes second cylinder 36 to move axially away from first cylinder 34. Deploy spring 38 extends actuator 24 until second cylinder 36 is situated such that down-lock wedges 50 are radially within groove 51 in second cylinder 36. Groove 51 is near the end of second cylinder 36 that is adjacent to first cylinder 34. When deploy spring 38 causes first cylinder 34 and second cylinder 36 to move until down-lock wedges 50 reach groove 51 in second cylinder 36, actuator 24 is in a deployed position.

After actuator 24 has reached a deployed position, actuator 24 is locked in place by down-lock wedges 50, which are pushed radially outward into groove 51 by slider 53 as lock bolt 52 and slider 53 move axially away from first end 26 (to the right in FIGS. 3A and 3B). When locked in a deployed position, down-lock wedges 50 are on the radially outer side of second aperture 46 in groove 51 in second cylinder 36. Because down-lock wedges 50 are within groove 51, second cylinder 36 is prevented from axial movement and actuator 24 is locked in a deployed position.

To move actuator 24 into a stowed position from a deployed position, pressure is introduced into actuator 24. This pressure may be caused by a gas or other fluid being pumped into actuator 24. The pressure moves second cylinder 36 toward first cylinder 34 by causing a volume between piston rod 42 and second cylinder 36 to expand axially and push second cylinder 36 towards first cylinder 34. The pressure also moves lock bolt 52 and slider 53 in an opposite direction than the movement of second cylinder 36 by causing a volume within piston rod 42 to expand axially and push slider 53 toward first end 26.

The pressure within actuator 24 causes slider 53 to move toward stow lock pawls 48 until slider 53 contacts stop 62 (located on piston rod 42), which prevents slider 53 from contact with stow lock pawls 48. The pressure also causes lock bolt 52 to move toward stow lock pawls 48 and continue moving toward stow lock pawls 48 even after slider 53 has contacted stop 62. Eventually, the pressure causes rollers 57, which are supported by lock bolt 52, to push stow lock pawls 48 radially outward.

Actuator 24 is completely retracted and is locked in place by stow lock pawls 48. When locked in a stowed position, stow lock pawls 48 are on the radially outer side of first aperture 44 adjacent to second cylinder 36 near first end 26. Because stow lock pawls 48 are adjacent to second cylinder 36 (stow lock pawls 48 are adjacent to the end of second cylinder 36 that is closest to first end 26), second cylinder 36 is prevented from axial movement away from first cylinder 34 and actuator 24 is locked in a stowed position. The configuration of stow lock pawls 48 and second cylinder 36 in the stowed position causes stresses on stow lock pawls 48. Stow lock pawls 48 are pushed radially outward into a stowed and locked position by rollers 57 that are guided by lock bolt 52 at roller assembly 56. Lock bolt 52 positions rollers 57 to be in a stowed position by moving independently from slider 53 after slider 53 has contacted stop 62 (and is prevented from continued movement toward stow lock pawls 48).

Figure 4:
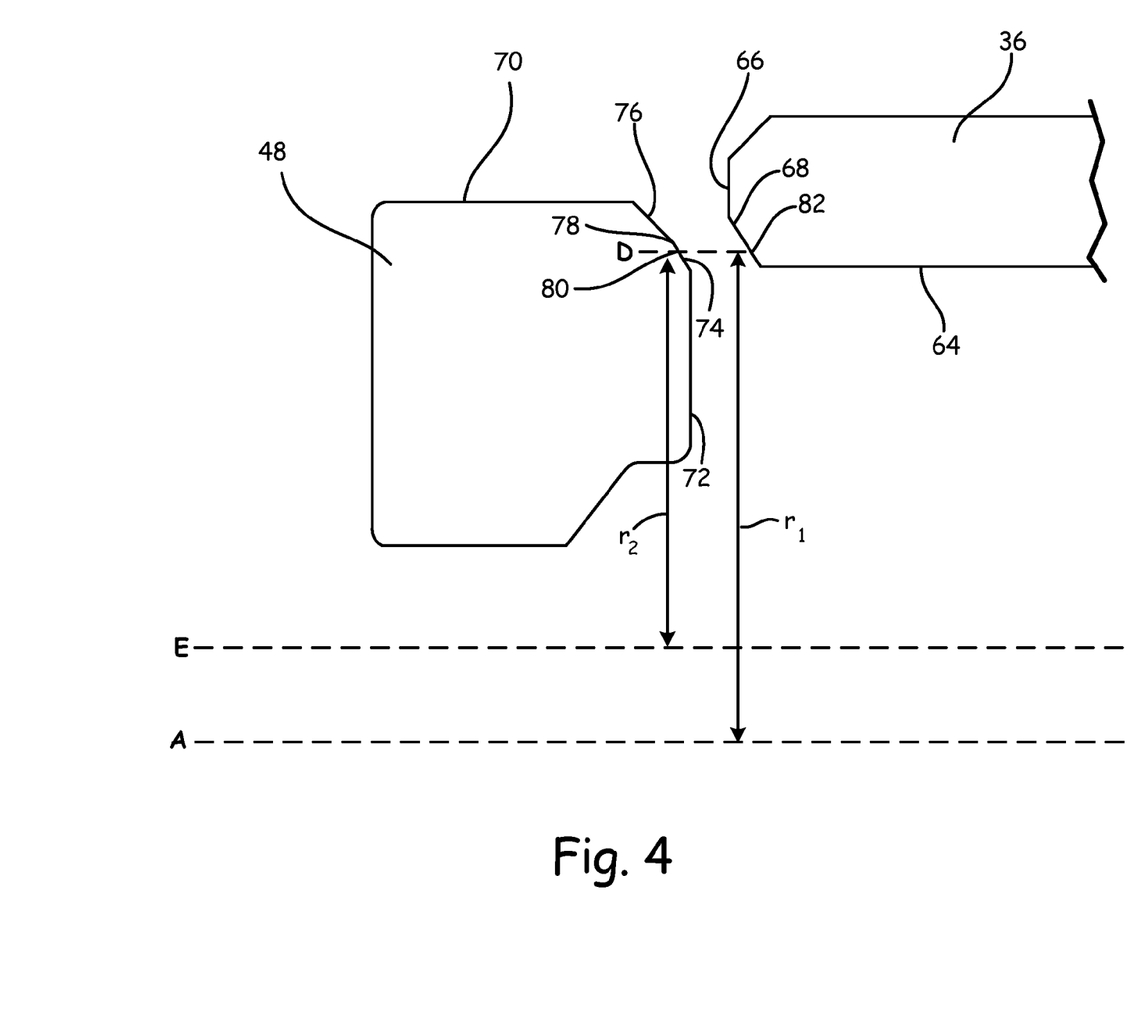
FIG. 4 is an enlarged cross-sectional view of detail 4 of the actuator in FIG. 3A.

FIG. 4 is an enlarged cross-sectional view of section 4 of the actuator in FIG. 3A, showing second cylinder 36 and stow lock pawl 48. Second cylinder 36 includes inner surface 64, end 66, and mating surface 68. Stow lock pawl 48 includes outer surface 70, end 72, crown 74, relief 76, and edge 78. Datum axis D extends between crown datum point 80 on crown 74 and mating datum point 82 on mating surface 68.

Inner surface 64 of second cylinder 36 is parallel to centerline A of actuator 24. Mating surface 68 is frusto-conical in shape. In the embodiment shown, mating surface 68 is a cone that extends at an angle of thirty degrees. Mating surface 68 has mating radius $r_1$, which extends from mating datum point 82 on mating surface 68 and datum axis D to centerline A. Mating radius $r_1$ defines the frusto-conical shape of mating surface 68.

Outer surface 70 of stow lock pawl 48 is parallel to crown axis E. Crown axis E is parallel to centerline A but is closer to datum axis D than centerline A. Crown 74 and relief 76 meet at edge 78. Crown 74 and relief 76 are frusto-conical in shape. In the embodiment shown, crown 74 is a cone that extends at an angle of thirty degrees and relief 76 is a cone that extends at an angle of forty-five degrees. Crown 74 has crown radius $r_2$, which extends from crown datum point 80 on crown 74 and datum axis D to crown axis E. Crown radius $r_2$ defines the frusto-conical shape of crown 74.

During deployment and stowing of actuator 24, actuator 24 translates hydraulic pressure into movement, including movement of inner cylinder 36 and stow lock pawls 48. Due to varying actuator loads, the mating of inner cylinder 36 and stow lock pawls 48 results in varying stresses on crown 74 of stow lock pawls 48. The shape of crown 74 provides an advantageous stress distribution along crown 74 at varying actuator loads in the deployed position, during deployment, and in the stowed position.

More specifically, contact between mating surface 68 and crown 74 under varying actuator loads results in varying stresses on crown 74. In the embodiment shown, mating surface 68 and crown 74 both extend at an angle of thirty degrees. However, crown radius $r_2$ is smaller than mating radius $r_1$. Therefore, when mating surface 68 and crown 74 are placed under an actuator load, mating surface 68 and crown 74 are not in contact along the entire length of mating surface 68 and crown 74. However, when an actuator load is applied to inner cylinder 36, mating surface 68 deflects under that load.

Crown 74 is shaped to account for deflection of mating surface 68 under varying actuator loads. Due to the fact that crown radius $r_2$ is smaller than mating radius $r_1$, even when mating surface 68 deflects, mating surface 68 contacts crown 74 such that the stress on stow lock pawl 48 is distributed along crown 74 and stow lock pawl 48. Therefore, the ratio of crown radius $r_2$ to mating radius $r_1$ provides an advantageous stress distribution along crown 74 and stow lock pawl 48 at varying actuator loads (see FIGS. 6A-6B for more detail). This prevents stow lock pawls 48 from becoming over stressed and damaged under varying actuator loads. In one embodiment, the ratio of crown radius $r_2$ to mating radius $r_1$ is less than 0.98. In another embodiment, the ratio of crown radius $r_2$ to mating radius $r_1$ is less than 0.95. In another embodiment, the ratio of crown radius $r_2$ to mating radius $r_1$ is less than 0.94. In the embodiment shown, the ratio of crown radius $r_2$ to mating radius $r_1$ is equal to 0.939.

Figure 5:
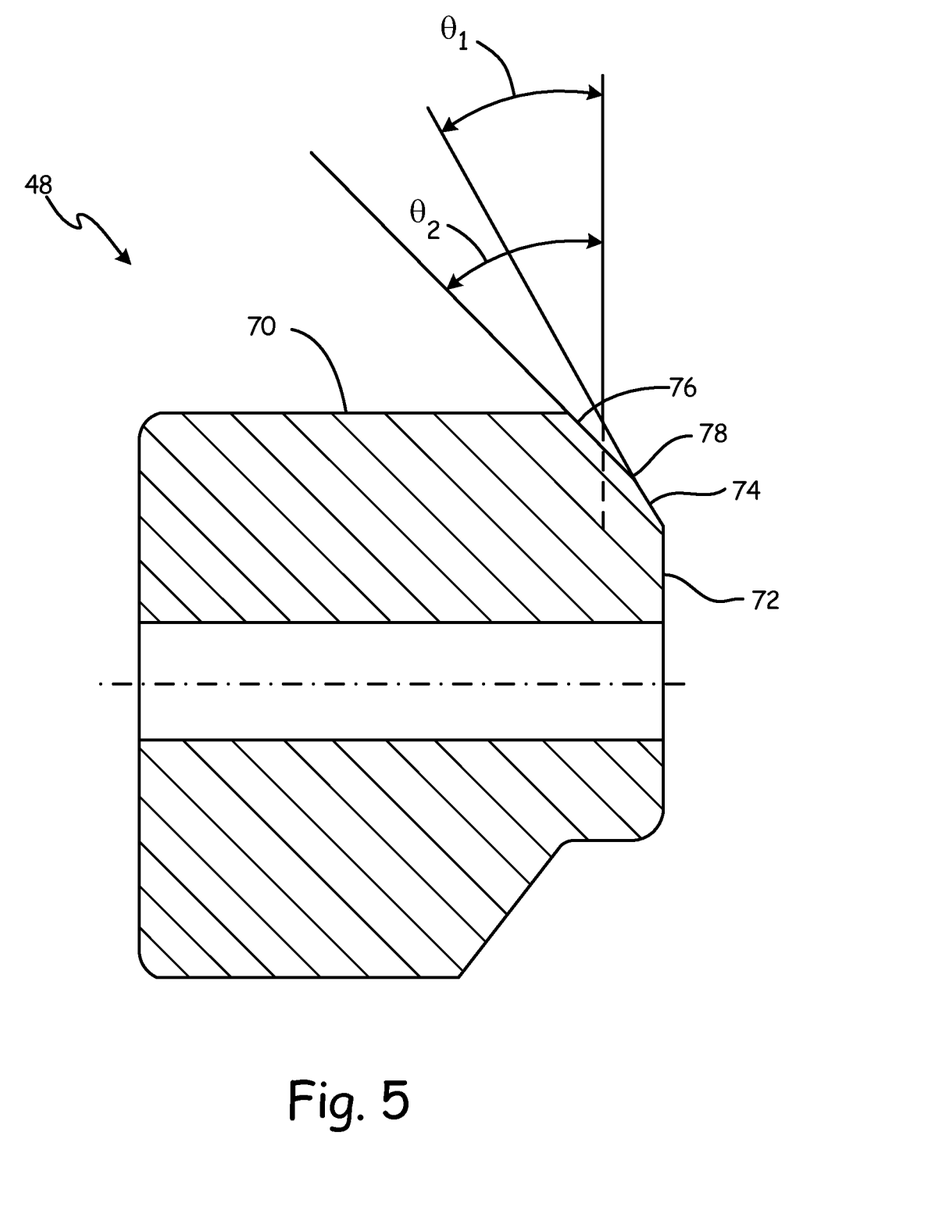
FIG. 5 is a cross-sectional view of a stow lock pawl of the actuator.

FIG. 5 is a cross-sectional view of stow lock pawl 48 of actuator 24. Stow lock pawl 48 includes outer surface 70, end 72, crown 74, relief 76, and edge 78. Crown 74 and relief 76 meet at edge 78. As described with respect to FIG. 4, stow lock pawl 48 is shaped for advantageous stress distribution along crown 74 under varying actuator loads. Crown 74 extends at angle $\theta_1$, which is thirty degrees in the embodiment shown. Relief 76 extends at angle $\theta_2$, which is forty-five degrees in the embodiment shown.

Figure 6A:
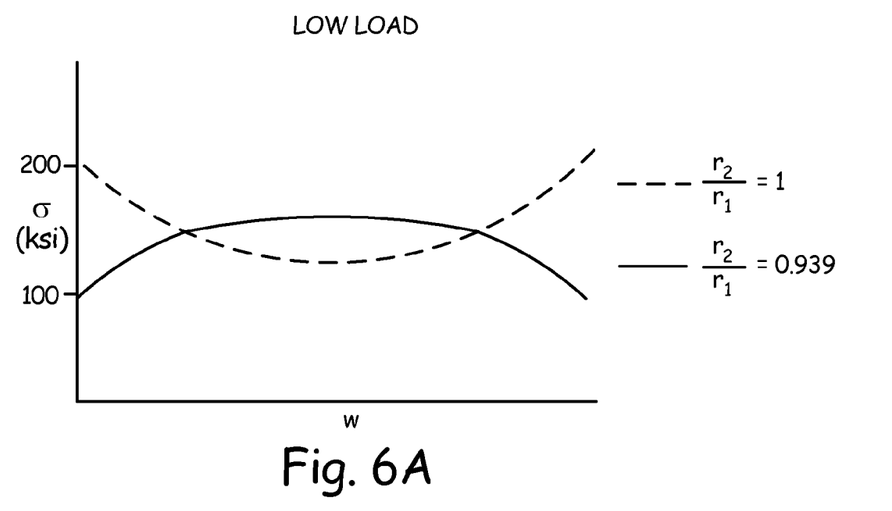
FIGS. 6A-6B are graphs of stress distribution in the stow lock pawl of FIG. 5.
Figure 6B:
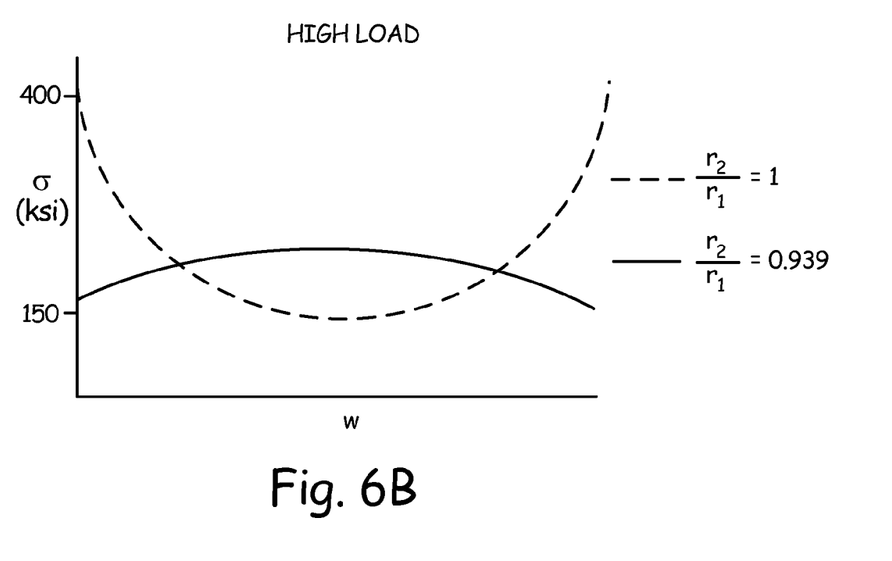

FIGS. 6A-6B are graphs of stress distribution in stow lock pawl 48 of FIGS. 4-5. FIG. 6A is a graph of stress distribution along crown 74 of stow lock pawl 48 under low actuator load, such as 6,000 pounds. FIG. 6B is a graph of stress distribution along crown 74 of stow lock pawl 48 under high actuator load, such as 12,000 pounds. FIGS. 6A-6B show stress versus position w along crown 74 of stow lock pawl 48, where the ratio of crown radius $r_2$ to mating radius $r_1$ is equal to 0.939. Additionally, FIGS. 6A-6B show the stress distribution under low actuator load and high actuator load in a crown of a stow lock pawl where the ratio of crown radius $r_2$ to mating radius $r_1$ is equal to one.

Referring to FIG. 6A, when a stow lock pawl with a ratio of crown radius $r_2$ to mating radius $r_1$ equal to one is placed under a low actuator load, stress is concentrated at the edges of the crown. However, when stow lock pawl 48 is placed under a low actuator load, stress is more evenly distributed along crown 74. When mating surface 68 deflects under a low actuator load, mating surface 68 contacts crown 74 such that the stress on stow lock pawl 48 is distributed along stow lock pawl 48 rather than concentrated at the edges of stow lock pawl 48.

Referring to FIG. 6B, when a stow lock pawl with a ratio of crown radius $r_2$ to mating radius $r_1$ equal to one is placed under a high actuator load, stress is even more concentrated at the edges of the crown than under a low actuator load. A high actuator load can result in damage and over-stress in a stow lock pawl with a ratio of crown radius $r_2$ to mating radius $r_1$ equal to one. However, when stow lock pawl 48 is placed under a high actuator load, stress is more evenly distributed along crown 74. When mating surface 66 deflects even more under a high actuator load, mating surface 68 contacts crown 74 such that the stress on stow lock pawl 48 is distributed along stow lock pawl 48 rather than concentrated at the edges of stow lock pawl 48. This limits the stress on stow lock pawl 48 even at high actuator loads such as 12,000 pounds. Therefore, the shape of stow lock pawl 48 is advantageous at both low actuator loads and high actuator loads, preventing damage to stow lock pawl 48 due to varying actuator loads during deployment and stowing of actuator 24.

Discussion of Possible Embodiments

The following are non-exclusive descriptions of possible embodiments of the present invention.

An actuator for a ram air turbine system, according to an exemplary embodiment of this disclosure, among other possible things includes a piston rod that is cylindrical in shape and centered about a centerline, and stow lock pawls supported by the piston rod and able to move radially. Each of the stow lock pawls has a crown with a crown radius. The actuator further includes a lock bolt extending along the centerline radially within the piston rod and configured to be axially movable within the piston rod between a stowed position and a deployed position. The actuator further includes rollers radially outward from the centerline configured to be guided by the lock bolt and a cylinder having a mating surface with a mating radius. The cylinder is positioned radially outward from the piston rod and configured to be axially movable between the stowed position and the deployed position. A ratio of the crown radius of the stow lock pawls to the mating radius of the cylinder is less than 0.98.

A further embodiment of the actuator, wherein the ratio of the crown radius of the stow lock pawls to the mating radius of the cylinder is less than 0.95.

A further embodiment of any of the foregoing actuators, wherein the ratio of the crown radius of the stow lock pawls to the mating radius of the cylinder is less than 0.94.

A further embodiment of any of the foregoing actuators, wherein the ratio of the crown radius of the stow lock pawls to the mating radius of the cylinder is equal to 0.939.

A further embodiment of any of the foregoing actuators, wherein the crown of each of the stow lock pawls is frusto-conical.

A further embodiment of any of the foregoing actuators, wherein a portion of the crown extends at an angle of thirty degrees.

A further embodiment of any of the foregoing actuators, wherein the mating surface of the cylinder is frusto-conical.

A further embodiment of any of the foregoing actuators, wherein the mating surface extends at an angle of thirty degrees.

A further embodiment of any of the foregoing actuators, wherein a portion of the crown extends at a same angle as a portion of the mating surface.

A further embodiment of any of the foregoing actuators, wherein the stow lock pawls include four stow lock pawls.

A further embodiment of any of the foregoing actuators, wherein the rollers include four rollers.

A further embodiment of any of the foregoing actuators, wherein the stow lock pawls include three stow lock pawls.

A further embodiment of any of the foregoing actuators, wherein the rollers include three rollers.

A further embodiment of any of the foregoing actuators, wherein the stow lock pawls include two stow lock pawls.

A further embodiment of any of the foregoing actuators, wherein the rollers include two rollers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An actuator for a ram air turbine system comprising:
   a piston rod that is cylindrical in shape and centered about a centerline;
   a plurality of stow lock pawls supported by the piston rod and able to move radially, each of the plurality of stow lock pawls having an outer surface, an end, a frusto-conical crown with a crown radius positioned between the outer surface and the end, and a frusto-conical relief positioned between the crown and the outer surface;
   a lock bolt extending along the centerline radially within the piston rod, the lock bolt configured to be axially movable within the piston rod between a stowed position and a deployed position;
   a plurality of rollers radially outward from the centerline configured to be guided by the lock bolt; and
   a cylinder having a frusto-conical mating surface with a mating radius, the cylinder positioned radially outward from the piston rod and configured to be axially movable between the stowed position and the deployed position;
   wherein a ratio of the crown radius of the plurality of stow lock pawls to the mating radius of the cylinder is between 0.90 and 0.98; and
   wherein the crown and the mating surface both extend at a first angle, and the relief extends at a second angle that is different than the first angle.

2. The actuator of claim 1, wherein the ratio of the crown radius of the plurality of stow lock pawls to the mating radius of the cylinder is between 0.90 and 0.95.

3. The actuator of claim 1, wherein the ratio of the crown radius of the plurality of stow lock pawls to the mating radius of the cylinder is between 0.90 and 0.94.

4. The actuator of claim 1, wherein the ratio of the crown radius of the plurality of stow lock pawls to the mating radius of the cylinder is equal to 0.939.

5. The actuator of claim 1, wherein a portion of the crown extends at an angle of thirty degrees.

6. The actuator of claim 1, wherein the mating surface extends at an angle of thirty degrees.

7. The actuator of claim 1, wherein the first angle is thirty degrees and the second angle is forty-five degrees.

8. The actuator of claim 1, wherein the plurality of stow lock pawls comprises four stow lock pawls.

9. The actuator of claim 8, wherein the plurality of rollers comprises four rollers.

10. The actuator of claim 1, wherein the plurality of stow lock pawls comprises three stow lock pawls.

11. The actuator of claim 10, wherein the plurality of roller comprises three rollers.

12. The actuator of claim 1, wherein the plurality of stow lock pawls comprises two stow lock pawls.

13. The actuator of claim 12, wherein the plurality of rollers comprises two rollers.

* * * * *